United States Patent Office 2,893,831
Patented July 7, 1959

2,893,831

TERNARY SULPHIDES, SELENIDES AND TELLURIDES OF BISMUTH AND THALLIUM AND THEIR PREPARATION

Tom A. Bither, Jr., Wilmington, Del., assignor to E. I. du Pont de Nemours and Company, Wilmington, Del., a corporation of Delaware No Drawing. Application October 10, 1957
Serial No. 689,265

8 Claims. (Cl. 23—50)

This invention relates to new compositions of matter and to their preparation. More particularly, the invention is concerned with ternary sulfides, selenides and tellurides of bismuth and thallium, and with processes for preparing them.

In recent years the field of electronics has made spectacular advances. These advances have stimulated great research interest in semi-conductors and their applications in crystal rectifiers, transistors, and photoconductive and thermoelectric devices. Notwithstanding the industrial progress which has been made, there is still need for better and lower cost semi-conductors.

Currently, ultrahigh purity silicon and germanium are the only materials which are being promoted commercially for application in semi-conductor fields. However, silicon of the degree of purity required for many applications is costly and difficult to produce; and neither germanium nor silicon possesses the best combination of properties for all recognized semi-conductor applications such as, for example, in thermoelectric devices.

It is an object of this invention to provide novel semi-conductors that possess properties which make them suitable for many of the known semi-conductor uses. A further object is to provide methods for preparing such novel semi-conductors. Another object is to provide novel ternary compounds useful for interconverting heat and electrical energies. Other objects will appear hereinafter.

These objects are accomplished by the present invention of ternary thallium bismuth sulfides, selenides and tellurides corresponding in molecular formula to $TlBiX_2$, in which X is a member of the group consisting of sulfur, selenium and tellurium.

The compositions of this invention are conveniently made by fusing together the component elements, namely, thallium, bismuth and an element of group VI-A of the periodic table having an atomic number within the range of 16 to 52, under a blanket of an inert gas for from 2 to 30 hours, and thereafter permitting the reaction mixture to cool. The periodic table referred to herein is the one set forth in Deming's "General Chemistry," 5th ed., John Wiley & Sons.

It will be understood that the ternary compounds of this invention can be made at temperatures in the range of 250° to 1000° C. Generally, however, it is preferred to employ temperatures above 300° C. in order to increase reaction rate and hence reduce time of reaction and below 1000° C. to minimize any tendency of the formed sulfides, selenides, or tellurides to decompose. Since the best balance of reaction rate with yield of desired products are realized within the range of 340–900° C., this embraces the temperature conditions generally employed.

In preparing the ternary compositions of this invention, the thallium and bismuth are mixed in such proportions as to provide a gram atom ratio of 1:1. The sulfur group element is provided in amount such as to have in the final composition at least two gram atoms per gram atom of thallium. These proportions can be obtained either by using preformed sulfur group compounds of thallium and bismuth, by mixing the sulfur group element with thallium and bismuth or by reacting a sulfur group element hydride with the metals, oxides, or hydroxides. By the term "sulfur group element" is meant an element of the family consisting of sulfur, selenium and tellurium.

The ternary sulfur group compositions of this invention can be made at atmospheric pressure or they can be made in closed reactors under autogenous pressure, i.e., self-generated pressure.

The ternary sulfur group compositions of this invention are useful in such devices as crystal rectifiers, transistors, and in thermoelectric and other semi-conductor devices.

The examples which follow illustrate but do not limit this invention. The X-ray diffraction data given were obtained by the Debye-Scherrer powder method with a North American Phillips unit, using copper K α-radiation filtered through nickel to give an effective wave length of 1.542 A. units. In this method the sample is finely divided and packed into a capillary tube, which is mounted in a camera having a 114.9 mm. diameter.

In the tabulations of the diffraction data, the heading "I" refers to the observed intensity values and "d" to the interplanar spacings expressed in angstrom (A.) units. The letter S designates the strongest line recorded; $M_1$, $M_2$, $M_3$, and $M_4$ are lines of medium intensity, the order of intensity decreasing with increasing numerical sequence; F means that the line is faint; and V that it is very weak.

EXAMPLE I

A blend of $Tl_2S$ and $Bi_2S_3$ weighing approximately 0.5 g. and containing the sulfides in 1:1 mole ratio is compressed into an 0.25 inch cylindrical pellet and sealed in an evacuated heat-resistant glass tube. The charged tube is then heated at 324° to 328° C. for 18 hours and then air-quenched to room temperature. After subtraction of the pattern for trace amounts of $Bi_2S_3$, the remaining X-ray diffraction pattern finds no counterpart in the ASTM (American Society for Testing Materials) file of known X-ray diffraction data. The new ternary sulfide by analysis corresponds to $TlBiS_2$. The X-ray diffraction pattern of the product is tabulated below:

X-ray data—$TlBiS_2$

| I | d |
|---|---|
| $M_2$ | 3.63 |
| S– | 3.36 |
| S | 2.97 |
| $M_1$ | 2.16 |
| $M_1$ | 2.04 |
| $M_3$ | 1.857 |
| F | 1.824 |
| $M_2$ | 1.782 |
| $M_3$ | 1.685 |
| $M_4$ | 1.487 |
| F | 1.428 |
| $M_4$ | 1.365 |

EXAMPLE II

An intimate blend of 2.31 g. of $Tl_2S$ (0.0524 mole) and 2.69 g. of $Bi_2S_3$ (0.00524 mole) is compressed into a 0.25 inch cylindrical pellet and charged into a quartz tube. The tube is evacuated, flushed several times with argon, and then gradually heated to a temperature of 790° C. under 1 atmosphere of argon for 6.75 hours. The contents of the tube is allowed to cool to room temperature under argon and discharged. The product is a silver-gray, metallic-appearing, crystalline mass, An X-ray diffraction powder pattern of this material duplicates that of the TlBiS$_2$ compound prepared as in Example I, except for the absence of the traces of Bi$_2$S$_3$ observed in the former compound. The X-ray diffraction pattern is tabulated below:

*X-ray data—TlBiS$_2$*

| I | d |
|---|---|
| M$_3$ | 3.645 |
| M$_1$ | 3.376 |
| S | 2.976 |
| M$_2$ | 2.167 |
| M$_2$ | 2.052 |
| M$_4$ | 1.866 |
| F | 1.826 |
| M$_3$ | 1.789 |
| F | 1.754 |
| M$_4$ | 1.694 |
| M$_4$ | 1.492 |
| F | 1.433 |
| V | 1.383 |
| M$_4$ | 1.364 |
| F | 1.336 |
| M$_4$ | 1.307 |
| F | 1.278 |
| F | 1.207 |
| V | 1.185 |
| V | 1.174 |

A limited thermal analysis of the system Tl$_2$S—Bi$_2$S$_3$ showed the compound TlBisS$_2$ to melt congruently at approximately 725° C.

EXAMPLE III

A pelleted blend of 4.620 g. of Tl$_2$S (0.01045 mole) and 5.380 g. of Bi$_2$S$_3$ (0.01045 mole) is charged into an 8 mm. I.D. quartz tube, the lower extremity of which is drawn into a fine capillary terminating in a small bulb. This material is pumped under high vacuum at a maximum temperature of 235° C. for approximately 24 hours and the tube is then sealed off under vacuum.

A single crystal of TlBiS$_2$ is then grown from the melt by lowering the evacuated tube containing the sample through a fixed thermal gradient (25–35° C./inch) at the rate of 16 inches/day, the maximum temperature of the furnace being 786° C.

The X-ray diffraction pattern of this product corresponds to that of the product of Example I.

Particles of the above-described single crystal of TlBiS$_2$ are observed to have the following physical properties:

Resistivity (room temperture): 0.002 ohm-cm.
Thermoelectric power: 66 μv. volts (average)/° C., the hot junction being positive.
Hall coefficient: —0.60 cm.$^3$/coulomb, using the sign convention given by Equation 5b–283 of page 5–98 of the American Institute of Physics Handbook (McGraw-Hill, 1957).
Energy gap from infrared: 0.5 ev.
Thermal conductivity (room temp.): 0.04 watt/cm.° C.

The above properties are in the range of those desired in a semi-conductor for thermoelectric devices.

EXAMPLE IV

A mixture of 1.84 g. of Tl (0.009 mole), 1.88 g. of Bi (0.009 mole), and 1.42 g. of Se (0.018 mole) is charged into a quartz tube and then alternately evacuated and flushed with argon several times. The reactants are then gradually heated in a furnace under 1 atmosphere of argon for 5⅓ hours to a temperature of 822° C. The heat is then turned off and the sample allowed to cool to room temperature under argon. The reactants have fused to a bright, silvery, metallic-appearing, crystalline mass.

An X-ray diffraction powder pattern of this material finds no counterpart in the ASTM file of known X-ray diffraction data. The product by analysis corresponds to TlBiSe$_2$. The X-ray diffraction pattern is tabulated below:

*X-ray data—TlBiSe$_2$*

| I | d |
|---|---|
| F | 4.02 |
| M$_3$ | 3.74 |
| M$_2$ | 3.49 |
| S | 3.07 |
| M$_4$ | 2.82 |
| M$_4$ | 2.70 |
| M$_4$ | 2.63 |
| V | 2.41 |
| M$_1$ | 2.23 |
| M$_1$ | 2.13 |
| V | 2.06 |
| V | 2.00 |
| M$_4$ | 1.92 |
| M$_3$ | 1.86 |
| F | 1.812 |
| M$_3$ | 1.745 |
| V | 1.591 |
| M$_3$ | 1.536 |
| M$_4$ | 1.462 |
| V | 1.420 |
| M$_3$ | 1.399 |
| V | 1.379 |
| M$_3$ | 1.350 |
| M$_4$ | 1.303 |

A cooling curve on the compound TlBiSe$_2$ indicates that its freezing point is approximately 703° C. This is significant evidence that the product is a compound instead of a mixture.

EXAMPLE V

A mixture of 1.93 g. of Tl (0.00944 mole), 1.97 g. of Bi (0.00944 mole), and 2.41 g. of Te (0.0188 mole) is charged into a quartz tube and then alternately evacuated and flushed with argon several times. The reactants are then gradually heated in a furnace under 1 atmosphere of argon for 5 hours to a temperature of 818° C. The heat is then turned off and the sample is allowed to cool to room temperature under argon. The reactants fuse to a dull silvery, metallic-appearing, crystalline mass.

An X-ray diffraction powder pattern of this material finds no counterpart in the ASTM file of known X-ray diffraction data. The product by analysis corresponds to TlBiTe$_2$. The X-ray diffraction data are tabulated below:

*X-ray data—TlBiTe$_2$*

| I | d |
|---|---|
| F | 3.86 |
| M$_4$ | 3.70 |
| S | 3.24 |
| F | 3.11 |
| M$_4$ | 2.92 |
| M$_4$ | 2.80 |
| M$_1$ | 2.32 |
| M$_1$ | 2.26 |
| V | 2.17 |
| V | 1.990 |
| M$_4$ | 1.920 |
| M$_4$ | 1.850 |
| V | 1.711 |
| M$_2$ | 1.617 |
| M$_3$ | 1.464 |
| M$_3$ | 1.430 |
| M$_4$ | 1.353 |
| M$_4$ | 1.315 |

A cooling curve on the compound TlBiTe$_2$ indicates that its freezing point is approximately 544° C.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A ternary compound represented by the formula TlBiX$_2$ wherein X is a member of the group consisting of sulfur, selenium and tellurium.

2. Thallium bismuth sulfide having the formula $TlBiS_2$.

3. Thallium bismuth selenide having the formula $TlBiSe_2$.

4. Thallium bismuth telluride having the formula $TlBiSe_2$.

5. Process for preparing ternary compounds of the formula $TlBiX_2$ wherein X is a member of the group consisting of sulfur, selenium and tellurium which comprises heating for a period of from two to thirty hours at a temperature within the range of 250° to 100° C. thallium and bismuth in contact with an element selected from the group consisting of sulfur, selenium and tellurium, said thallium, bismuth and said element being present in the reaction mixture in such proportions as to provide in the resultant ternary composition a gram atom ratio of thallium:bismuth:said element of 1:1:2.

6. Process for preparing ternary compounds of the formula $TlBiX_2$ wherein X is a member of the group consisting of sulfur, selenium and tellurium which comprises heating for a period of from two to thirty hours at a temperature within the range of 340° to 900° C. thallium and bismuth in contact with an element selected from the group consisting of sulfur, selenium and tellurium, said thallium, bismuth and said element being present in the reaction mixture in such proportions as to provide in the resultant ternary composition a gram atom ratio of thallium:bismuth:said element of 1:1:2.

7. Process for preparing ternary compounds of the formula $TlBiX_2$ wherein X is a member of the group consisting of sulfur, selenium and tellurium which comprises heating in a closed reactor at a temperature within the range of 340° to 900° C. for a period of from 2 to 30 hours thallium and bismuth in contact with an element selected from the group consisting of sulfur, selenium and tellurium, said thallium, bismuth and said element being present in the reaction mixture in such proportions as to provide in the resultant ternary composition a gram atom ratio of thallium:bismuth:said element of 1:1:2, and thereafter cooling the resulting product.

8. Process for preparing ternary compounds of the formula $TlBiX_2$ wherein X is a member of the group consisting of sulfur, selenium and tellurium which comprises heating under autogenous pressure at a temperature within the range of 340° to 900° C. for a period of from 2 to 30 hours thallium and bismuth in contact with an element selected from the group consisting of sulfur, selenium and tellurium, said thallium, bismuth and said element being present in the reaction mixture in such proportions as to provide in the resultant ternary composition a gram atom ratio of thallium:bismuth:said element of 1:1:2, and thereafter cooling the resulting product.

References Cited in the file of this patent

UNITED STATES PATENTS

| | | |
|---|---|---|
| 2,728,637 | Alderson et al. | Dec. 27, 1955 |
| 2,770,528 | Maynard | Nov. 13, 1956 |

UNITED STATES PATENT OFFICE

CERTIFICATE OF CORRECTION

Patent No. 2,893,831                        July 7, 1959

Tom A. Bither, Jr.

It is hereby certified that error appears in the printed specification of the above numbered patent requiring correction and that the said Letters Patent should read as corrected below.

Column 2, line 64, for "(0.0524 mole)" read -- (0.00524 mole) --; column 3, line 27, for "TlBisS$_2$" read -- TlBiS$_2$ --; column 5, line 5, for "TlBiSe$_2$" read -- TlBiTe$_2$ --; line 10, for "250° to 100° C." read -- 250° to 1000° C. --.

Signed and sealed this 1st day of December 1959.

(SEAL)
Attest:

KARL H. AXLINE                     ROBERT C. WATSON
Attesting Officer                    Commissioner of Patents